US011789456B2

(12) United States Patent
Tan et al.

(10) Patent No.: US 11,789,456 B2
(45) Date of Patent: Oct. 17, 2023

(54) OBJECT OR PERSON ATTRIBUTE CHARACTERIZATION

(71) Applicant: Zoox, Inc., Foster City, CA (US)

(72) Inventors: Qijun Tan, San Mateo, CA (US);
Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/884,488

(22) Filed: Aug. 9, 2022

(65) Prior Publication Data

US 2022/0382294 A1    Dec. 1, 2022

Related U.S. Application Data

(63) Continuation of application No. 16/797,155, filed on Feb. 21, 2020, now Pat. No. 11,460,857.

(51) Int. Cl.
| G06T 7/70 | (2017.01) |
| G06N 20/00 | (2019.01) |
| G06V 20/58 | (2022.01) |
| G05D 1/02 | (2020.01) |
| G06V 40/20 | (2022.01) |

(52) U.S. Cl.
CPC .......... *G05D 1/0253* (2013.01); *G06N 20/00* (2019.01); *G06T 7/70* (2017.01); *G06V 20/58* (2022.01); *G06V 40/23* (2022.01); *G05D 2201/0213* (2013.01)

(58) Field of Classification Search
CPC .......... G05D 1/0253; G05D 2201/0213; G06T 7/70; G06N 20/00; G06V 20/58; G06V 40/23
See application file for complete search history.

(56) References Cited

U.S. PATENT DOCUMENTS

| 2018/0336692 | A1* | 11/2018 | Wendel | ................... G06T 7/593 |
| 2020/0051252 | A1* | 2/2020 | Brown | ................... G06V 20/10 |
| 2021/0181837 | A1* | 6/2021 | Jiang | ..................... G06V 40/19 |

* cited by examiner

Primary Examiner — Jae N Noh
(74) Attorney, Agent, or Firm — Lee & Hayes, P.C.

(57) ABSTRACT

A vehicle computing system may implement techniques to determine attributes (or intent) of an object detected by a vehicle operating in the environment. The techniques may include determining a set of features with respect to a detected object by a first model and determining, by a second model and based on the set of features, one or more attributes of the object. The first model and the second model may be configured to process at least one image frame to determine the one or more attributes of the object. A model may receive sensor data as an input, and output features and/or an attribute for the detected object. Based on the attribute(s) of the object, a vehicle computing system may control operation of the vehicle.

20 Claims, 5 Drawing Sheets

OBJECT OR PERSON ATTRIBUTE CHARACTERIZATION

RELATED APPLICATIONS

This application is a continuation of and claims priority to U.S. patent application Ser. No. 16/797,155, filed Feb. 21, 2020, titled "OBJECT OR PERSON ATTRIBUTE CHARACTERIZATION," the entirety of which is incorporated herein by reference.

BACKGROUND

Planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. The planning systems may perform any number of operations (e.g., simulations, etc.) to determine an effect of each detected object on a potential action for the vehicle. An intent of such an object may impact the potential action.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
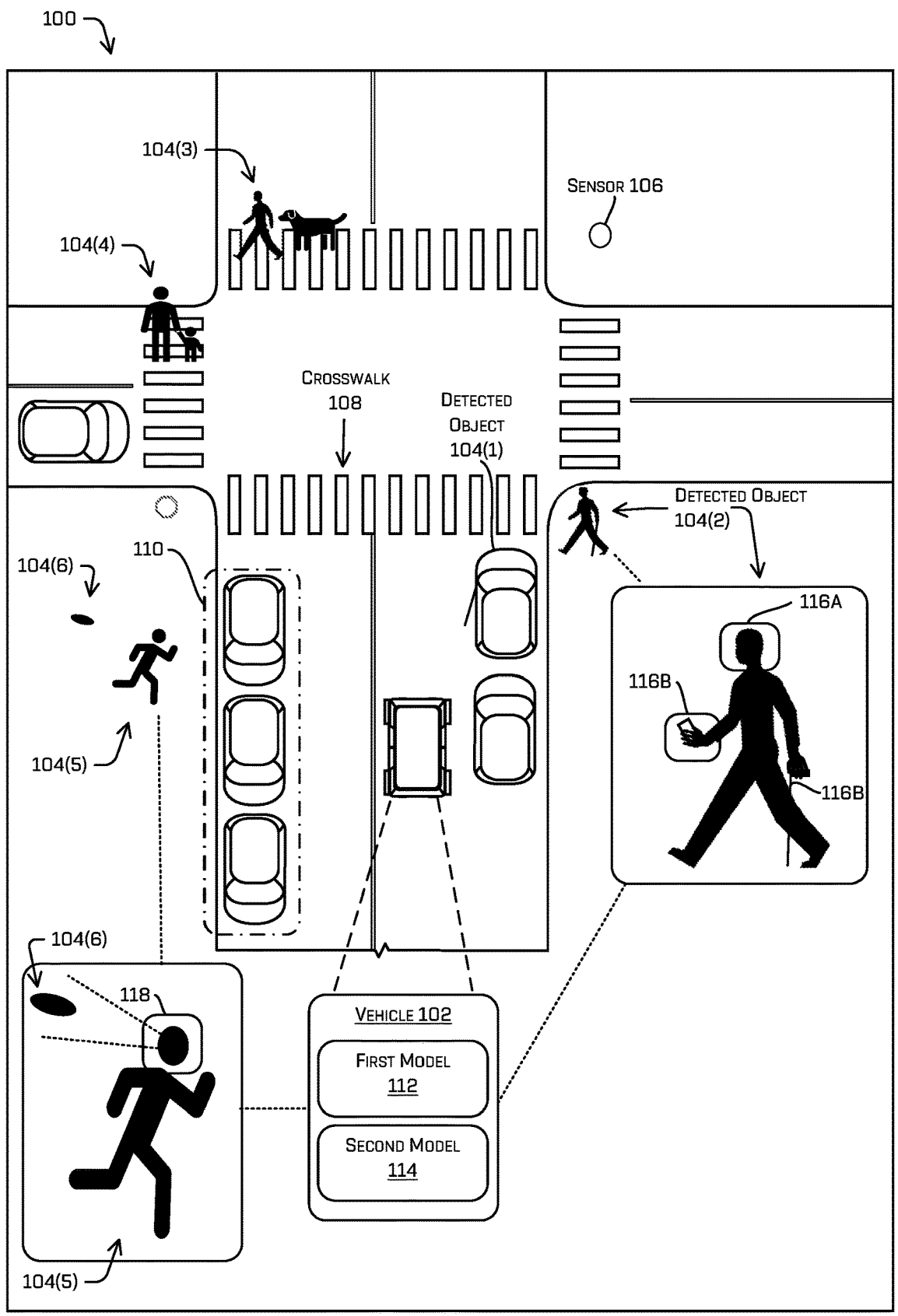
FIG. 1 is an illustration of an autonomous vehicle in an environment, in which an example attribute determination model may determine attributes for different objects.

As noted above, predicting behavior or intent of objects in an environment may impact a potential action of an autonomous vehicle. Movement of objects in the environment may change quickly.

This application describes techniques for applying and/or training a model to determine attributes of objects in an environment. In at least some examples, such attributes may comprise an intent. Such an intent may be indicative of a motion the object is taking or will take at some point in the near future. For example, one or more machine learned models may process image data associated with an object and determine a potential action that the object may take at a future time. In some examples, the object may be a pedestrian and the model may determine different attributes for the pedestrian (e.g., looking at phone, lying, crouching, entering car, existing car, and the like) based on one or more visual cues. Pedestrian intentions or attributes determined by the model(s) may be considered during vehicle planning thereby improving vehicle safety as a vehicle navigates in the environment.

In some examples, a first model may receive a set of image frames as an input and may output one or more extracted features of an object for one or more of the image frames. A computing device may receive the output from the first model and may determine a vector to represent each object feature extracted by the first model. In various examples, the computing device may combine the vectors representing the extracted object features to generate an input to a second model configured to output an attribute of the object. In some examples, the combined vector is further combined with a vector that identifies which, if any, of the image frames in the input to the second model are duplicate.

The set of image frames associated with the object may be captured by one or more sensors of a vehicle and may include a number of image frames. For example, the first model may receive five image frames as input. In examples when the sensor(s) has not yet captured five image frames depicting the object, a cached image vector representing an image frame may be duplicated to reach the number of image frames. Accordingly, not all the image frames in the set of image frames may be unique (by virtue of being a duplicate image frame or because the image frame represents only minor changes from a previous image frame). By combining vector representations of an output by the first model with a vector that identifies which, if any, of the image frames in the set of image frames are duplicate, the second model may determine attributes of an object that indicate what the object is doing in an environment (e.g., characterizes motion by the object).

By way of example and not limitation, one or more attributes of an object output by the second model may comprise one or more of: a location of the object in the environment relative to the vehicle, a proximity of the object to the vehicle, a proximity of the object to another object and/or position in the environment, a subclassification of the object, motion of the object (e.g., an action), or other factors.

Models used by an autonomous driving vehicle as described herein may be designed to perform attribute determination analogous to how a driver of a traditional vehicle pays attention while driving. For example, models may be designed to infer an intent of a pedestrian based on a pose of the pedestrian, objects in the pedestrian's possession or proximity (e.g., mobile device, stroller, etc.), proximity of the pedestrian to another object in the environment (e.g., a crosswalk), or other cues evident in at least one of the image frames in the set of image frames. In some examples, the model may access cached vector(s) representing different features of the object (e.g., features of the object at a time and/or over time) for use as input to the model. In some examples, a subsequent image frame captured by a sensor of a vehicle may be combined with one or more of the cached vectors to form an input to the model. Thus, once trained the model may determine an attribute of the object from a single image frame, much like a driver can tell if a pedestrian will change direction or velocity based on subtle characteristics of the pedestrian (e.g., head and/or body position). The model may, for example, process the subsequent image data and one or more of the cached vectors to identify attributes of a pedestrian such as standing, sitting, walking, running, wearing headphones (e.g., likely to not hear an approaching vehicle), using a mobile device, pushing a stroller, and so on.

The vehicle may detect objects using one or more sensors while navigating in the environment. The objects may include static objects (e.g., buildings, bridges, signs, etc.)

and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be input into the models to determine an attribute (e.g., one or more characterizations of motion and/or a subclassification, and so on) of objects in the environment. As described herein, models may be representative of machine learned models, statistical models, or a combination thereof. That is, a model may refer to a machine learning model that learns from a training data set to improve accuracy of an output (e.g., a determination). Additionally or alternatively, a model may refer to a statistical model that is representative of logic and/or mathematical functions that generate approximations which are usable to make determinations.

As discussed above, in some examples, different models may be applied to a single object or group of objects in the environment. For example, the vehicle may input sensor data to a first model to determine features of an object (e.g., a pedestrian, group of pedestrians, etc.) and may input at least a portion of the extracted features (e.g., represented by feature vectors) into a second model that may determine an attribute for the object. In some examples, the first model may comprise a first machine learned model trained to identify features (e.g., characteristics, velocity, trajectory, and/or pose) of an object and the second model may comprise a second machine learned model trained to determine attributes of the object based on a combination of the identified features. The output of the models may be used by a vehicle computing system (e.g., a planning component and/or a perception component of the vehicle computing system) to control operation of the vehicle. Outputs from models may be fed to a planning component of the vehicle to improve how the vehicle navigates (avoids and/or interacts with objects) in the environment.

In some examples, the vehicle computing system may be configured to semantically classify the detected objects. A classification may include another vehicle (e.g., car, a pick-up truck, a semi-trailer truck, a tractor, a bus, a train, etc.), a pedestrian, a bicyclist, an equestrian, or the like. For example, the vehicle computing system may detect two objects and classify a first object as a pedestrian and a second object as a pick-up truck. In some examples, a model for a pedestrian may be trained to detect gestures, faces, gaze direction, or other characteristics to determine features of the pedestrian at a particular time. Models may be trained to take into account characteristics or cues for other object classifications as well. For instance, a model for a vehicle may be trained to detect a make, model, color, condition, age of driver and/or passenger(s), attentiveness of driver and/or passenger(s), or other cues indicative of attributes of the vehicle.

In some examples, a vehicle computing device may determine a model to process image data (e.g., data representing an image frame or an output from another model) based at least in part on a classification of the object associated with the image data. For example, a different model may be determined for a vehicle than for a pedestrian, or for an animal. In some examples, different models may be configured to output different attributes based at least in part on a classification of the object. By way of example and not limitation, an animal model may process image data associated with an animal, and output attributes describing what the animal is doing at a time.

In some examples, using the attribute determination techniques described herein, a model may provide object attributes that improve safe operation of the vehicle by accurately characterizing motion of the object with fewer image frames as compared to previous models. For instance and as mentioned above, a subsequent image frame from a sensor may be processed by a first model and output a feature of an object in the subsequent image frame. This output by the first model may, for instance, be representative of a feature vector (e.g., a vector that represents the feature determined by the first model). In some examples, the output by the first model may be combined with one or more vectors stored in cache memory (e.g., feature vectors associated with previously processed image data by the first model). In such examples, although only a single image frame (e.g., the subsequent image frame) is processed by the first model, attributes for the object in the subsequent image frame are determined by a second model based at least in part on additional features (cached vectors representing additional features from the feature output by the first model).

As described herein, in some examples, functionality performed by a first model and a second model may be performed by a single model. That is, the first model and the second model may be part of a single model.

In some examples, a computational resource defined by a model for use to determine attributes may be representative of a memory resource, a processing resource, and/or a computational time. In some examples, models may define memory resources to use during attribute determination processing (e.g., memory amount, memory location, memory type, and the like) and/or processing resources (e.g., processor amount, processor cycles, processor cores, processor location, processor type, and the like) to use to determine attributes of the detected object. In this way, each model may be defined to utilize the processing resources that enable the model to perform operations in the least amount of time (e.g., to use the determined attributes in planning considerations of the vehicle). Accordingly, models may be allocated to objects to make the best use of available processing resources and enable more operations that may improve how a vehicle navigates in relation to the objects.

In various examples, a vehicle computing system may receive one or more instructions representative of output(s) from one or more models. The vehicle computing system may, for instance, send an instruction from the one or more instructions to a planning component of the vehicle that plans a trajectory for the vehicle and/or to a perception component of the vehicle that processes sensor data. Additionally or alternatively, output(s) from one or more models may be used by one or more computing devices remote from the vehicle computing system for training a machine learned model.

The vehicle computing system may be configured to determine an initial position of each detected object. In various examples, a prediction component of the vehicle computing system (e.g., models that predict behavior of an object) may determine one or more predicted trajectories associated with each detected object, such as from an initial position associated therewith. In some examples, the one or more predicted trajectories may be determined based on the sensor data and/or output(s) from a model. Each predicted trajectory may represent a potential path that the detected object may travel through the environment. The one or more predicted trajectories may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof. In such examples, the one or more predicted trajectories may be based on an initial velocity and/or direction of travel determined based on the sensor data. In some examples, the one or more predicted trajectories may be determined utilizing machine learning techniques. Additional details of generating trajectories to control a vehicle are described in U.S. patent application Ser. No. 15/632,208, filed Jun. 23, 2017, entitled "Trajectory Generation and Execution Architecture," which is incorporated herein by reference. Additional details of evaluating risk associated with various trajectories are described in U.S. patent application Ser. No. 16/206,877, filed Nov. 30, 2018, entitled "Probabilistic Risk for Trajectory Evaluation," which is incorporated herein by reference. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

In various examples, the vehicle computing system may be configured to determine actions to take while operating (e.g., trajectories to use to control the vehicle) based on attributes of an object determined by one or more models. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, a group of pedestrians, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

In various examples, the vehicle computing system may be configured to determine reference actions and/or sub-actions that are applicable to the vehicle in the environment. For example, a pedestrian crouching near an intersection would be predicted to behave differently than a pedestrian walking. For another example, a pedestrian with a stroller might behave differently than a pedestrian without one. In another non-limiting example, a pedestrian playing and running would be predicted differently than a pedestrian exiting a car or unloading an item from a car.

For each applicable action and sub-action, the vehicle computing system may implement different models and/or components to simulate future states (e.g., estimated states) by projecting the vehicle and relevant object(s) forward in the environment for the period of time (e.g., 5 seconds, 8 seconds, 12 seconds, etc.). The models may project the object(s) (e.g., estimate future positions of the object(s)) forward based on a predicted trajectory associated therewith. For instance, the models may predict a trajectory of a pedestrian on a skateboard differently from a pedestrian riding in a stroller. The vehicle computing system may project the vehicle (e.g., estimate future positions of the vehicle) forward based on a vehicle trajectory associated with an action. The estimated state(s) may represent an estimated position (e.g., estimated location) of the vehicle and an estimated position of the relevant object(s) at a time in the future. In some examples, the vehicle computing system may determine relative data between the vehicle and the object(s) in the estimated state(s). In such examples, the relative data may include distances, locations, speeds, directions of travel, and/or other factors between the vehicle and the object. In various examples, the vehicle computing system may determine estimated intentions at a pre-determined rate (e.g., 10 Hertz, 20 Hertz, 50 Hertz, etc.). In at least one example, the estimated states may be performed at a rate of 10 Hertz (e.g., 80 estimated intents over an 8 second period of time).

In various examples, the vehicle computing system may store sensor data associated with actual location of an object at the end of the set of estimated states (e.g., end of the period of time) and use this data as training data to train one or more models. For example, stored sensor data may be retrieved by a model and be used as input data to identify cues of an object (e.g., identify a feature, an attribute, or a pose of the object). In some examples, the vehicle computing system may provide the data to a remote computing device (i.e., computing device separate from vehicle computing system) for data analysis. In such examples, the remote computing system may analyze the sensor data to determine one or more labels for images, an actual location, velocity, direction of travel, or the like of the object at the end of the set of estimated states. In some such examples (e.g., an example in which an intent of a pedestrian is determined), ground truth positions of the orientation over the course of the log may be determined (either hand labelled or determined by another machine learned model) and such ground truth positions may be used to determine an actual intent of the pedestrian (e.g., did the pedestrian remain standing, cross the road, begin/continue running, begin/continue walking, etc.). In some examples, corresponding image data may be input into the model to determine attributes and a difference between the determined attributes and the actual attributes may be used to train the model.

The techniques discussed herein may improve a functioning of a vehicle computing system in a number of ways. Traditionally, in control planning for an autonomous vehicle, a vehicle computing system may consider a change in behavior of a detected dynamic object in an environment over time. The vehicle computing system may determine an action for the autonomous vehicle to take based on a determined attribute of the object shown in one or more image frames. However, by training a model as described herein (e.g., by determining attributes based on a most recent image), the model may reduce a computational load to determine attributes of objects in the environment, thereby improving the functioning of the vehicle computing system.

The techniques discussed herein may also improve a functioning of a vehicle computing system by receiving attributes of an object from a model that determines the attributes based at least in part on a combination of object features. In some examples, attributes from the model may be used to determine whether a pedestrian will change direction, velocity, or position regardless of how quickly the change occurs in the environment. In some examples, the vehicle computing system may improve safety by identifying an intent by an object without requiring long periods of time and/or subsequent image frames to identify the intent. Instead, data from a single image frame of a set of image frames may be used to determine a particular action by the object. As a result, the vehicle computing system can control operation of the vehicle by utilizing planning considerations that are more readily available than traditional planning considerations that wait to gather and process image frames until enough information is available to make the attribute determination.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. In another example, the techniques may be utilized in an aviation or nautical context, or in any system using machine vision (e.g., in a system using image data). While examples are given in the context of determining attributes of pedestrians, the techniques described herein are also applicable to determining attributes of other objects in the environment (e.g., vehicles, bicycles, skateboarders, animals, etc.).

FIG. 1 is an illustration of an autonomous vehicle (vehicle 102) in an environment 100, in which an example attribute determination model may determine attributes for different objects. A vehicle computing system (e.g., vehicle computing system 204) may implement the attribute determination models of the vehicle 102. While described as a separate system, in some examples, the attribute determination techniques described herein may be implemented by other vehicle systems, components, and/or computing devices. For example, and as will be described in further detail with regard to FIG. 2, the attribute determination techniques described herein may be implemented at least partially by or in association with a model component 230 and/or a planning component 224.

In various examples, the vehicle computing system may be configured to detect one or more objects 104 (e.g., objects 104(1), 104(2), 104(3), 104(4), 104(5), 104(6)) in the environment 100, such as via a perception component (e.g., perception component 222). In some examples, the vehicle computing system may detect the objects 104, based on sensor data received from one or more sensors. In some examples, the sensor(s) may include sensors mounted on the vehicle 102, and include, without limitation, ultrasonic sensors, radar sensors, light detection and ranging (LIDAR) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors 106 mounted in the environment 100.

In various examples, vehicle 102 may be configured to transmit and/or receive data from other autonomous vehicles and/or the sensors 106. The data may include sensor data, such as data regarding object(s) 104 detected in the environment 100. In various examples, the environment 100 may include the sensors 106 for traffic monitoring, collision avoidance, or the like. In some examples, the sensors 106 may be mounted in the environment to provide additional visibility in an area of reduced visibility, such as, for example, in a blind or semi-blind intersection. For example, an intersection in the environment 100 may be determined to have a blind intersection, where approaching vehicles may not be able to perceive object(s) 104 and/or other vehicles approaching from the left or right on the intersecting road. The intersection in the environment may thus include a sensor 106 to provide sensor data to an approaching vehicle 102 regarding an object 104, such as objects 104(3) and 104(4), located on the intersecting road.

In various examples, the vehicle computing system may receive the sensor data and may determine a type of object 104 (e.g., classify the type of object), such as, for example, whether the object 104 is a car, such as objects 104(1), a truck, a motorcycle, a moped, a bicyclist, a pedestrian, such as objects 104(2), 104(3), 104(4), 104(5), an airborne object (e.g., a ball, a frisbee, a drone, and so on), such as object 104(6), or the like.

FIG. 1 also depicts the environment 100 as including a crosswalk 108 and a row of parked cars 110. In some examples, models may be applied to objects proximate to the crosswalk 108 (such as object 104(2)) and/or the row of parked cars 110 (such as object 104(5)). In some examples, the vehicle 102 may determine different attributes for the pedestrian (e.g., looking at phone, lying, crouching, entering car, existing car, and the like) and use the different pedestrian attributes to infer an intent of the pedestrian (e.g., whether the pedestrian may walk, run, change direction, change position, change velocity, enter a crosswalk, enter a roadway, and so on). Pedestrian intentions determined by the vehicle 102 may be considered during vehicle planning (e.g., planning component 224) thereby improving vehicle safety as a vehicle navigates in the environment.

In various examples, the vehicle 102 may include a first model 112 and a second model 114 usable for determining attributes of one or more objects 104. The first model 112 and the second model 114 may determine one or more attributes of the object in a variety of ways by implementing different computations and/or classifiers specific to each model that enable a combination of object features to be considered during processing of one or more images (e.g., image frames representing different times). Generally, each of the first model 112 and the second model 114 may extract cues represented by the detected objects 104 within the environment 100.

In some examples, one or more of the first model 112 and the second model 114 may be employed to determine attributes of different objects 104 in the environment. In the illustrated example, the vehicle 102 inputs sensor data (e.g., image data) into the first model 112 that identifies, extracts, and/or labels features of an object surrounding the vehicle 102. For instance, upon detecting that the object 104(1) is a car with an open door a vehicle computing system of the vehicle 102 applies the first model 112 that performs operations to determine whether a driver or rider is present in the car, whether a person is exiting the car, and the like. For instance, the first model 112 may be trained to detect a make, model, color, condition, age of driver, attentiveness of driver, or other cues indicative of a feature (an action, a position, or a subclassification) of the vehicle. An output from the first model 112 representing a combination of features of the object is input into the second model 114 which determines one or more attributes (e.g., an action, a position, or a subclassification, and so on) of the object. By providing an input to the second model 114 that represents the combination of features of the object as described herein, the second model 114 determines attributes representative of a behavioral intent of the object with fewer image frames as previous models (e.g., predicts an intent of the object with more accuracy even when provided only a single image frame as input).

In some examples, attributes of an object, such as pedestrian, may include one or more of: standing, walking, running, crouching, sitting, lying down, police worker, construction worker, holding a street sign (up, down, or sideways), child, elderly (wrinkles, grey hair), walking implement (walking aids, seeing aids, etc.), holding an open umbrella, wearing headphones/earbuds, talking on phone, looking at object in hand, playing, child in stroller, person pushing or pulling stroller/cart, loading/unloading an item, wheelchair, walking an animal, eye contact with vehicle, exiting car, loading/unloading vehicle, driving/riding in an enclosed vehicle (on tram, in car, etc.), driving/riding in or on an open vehicle (trolley, escalator, etc.), skateboard rider, scooter rider, roller skate rider, and the like. For instance, a model may determine that object 104(3) is a pedestrian walking an animal, that object 104(4) is a pedestrian with a child. In the illustrated example, a model may determine that the object 104(5) is a person running and playing with the object 104(6) (e.g., an airborne object such as a frisbee).

As also illustrated in FIG. 1, upon detecting that the object 104(2) is a pedestrian a vehicle computing system of the vehicle 102 applies the first model 112 that determines features of the pedestrian (e.g., elderly, using a walking implement, walking, and so on) and applies the second model 114 that performs operations 116. In the illustrated example, the vehicle 102 inputs at least a portion of the sensor data associated with the pedestrian 104(2) into the first model 112 that may output a representation of features (e.g., a vector, a numeral, a value, a map, an embedding, and the like) associated with the pedestrian.

In various examples, the first model 112 and/or the second model 114 may perform operations 116 that include gaze detection 116A and object detection 116B. In some examples, gaze detection 116A may be used to determine features of the pedestrian by identifying whether the pedestrian is looking down at an object in their hand, looking at the vehicle 102, looking away from traffic, and so on. An output from the second model 114 may be communicated with a planning component or a perception component of the vehicle 102 which may cause the vehicle to operate with more caution (e.g., driving more slowly around a pedestrian looking at an object in their hand). As mentioned above, in some examples, a model may implement gaze detection to detect whether the pedestrian makes eye contact with the vehicle 102. If the model determines that the pedestrian made eye contact with the vehicle 102, the vehicle 102 may proceed with a different level of caution than when the pedestrian fails to make eye contact with the vehicle 102.

In various examples, the first model 112 and/or the second model 114 may employ object detection 116B during processing. In some examples, the second model 114 may be configured to detect or recognize additional details or features (e.g., detection of a computing device associated with pedestrian, detecting a gaze direction of the pedestrian, etc.) associated with the object 104(2) such that an attribute determined by the second model 114 is based at least in part on a combination of these additional details or features. In one particular example, the second model 114 may use gaze detection, and an attribute by the second model 114 may include that the pedestrian is staring at their computing device and is therefore unlikely to notice the vehicle 102 approaching. A planning component (e.g., planning component 224 of FIG. 2) of the vehicle 102 may use the outputs from the second model 114 to alter a route, change a trajectory, and/or change a velocity of the vehicle 102 (e.g., speed up, slow down, or stop) to optimize safety of the vehicle 102. By using an output from the second model 114, the vehicle 102 can perform actions more likely to result in the vehicle 102 operating safely in the environment 100 as compared to only implementing the first model 112.

In various examples, a model may perform attribute determination operations to determine attributes related to the object 104. In the illustrated example, the attribute determination operation may correspond to performing detection inside the vehicle 104(1) (e.g., head detection to identify occupants, movement detection, etc.) to identify whether occupants of the vehicle 104(1) are preparing to exit and likely be in the path of the vehicle 102. In various examples, a model may employ a door detector that detects door movement (e.g., whether a door of a vehicle is opening or closing). Using the attributes output by the model, a planning component may cause the vehicle 102 to proceed with more caution (e.g., based on the door opening) or operate with the same level of caution (e.g., based on the door closing). In some examples, head detection by the model may identify a number of occupants inside of the detected vehicle 104(1) and may cause the vehicle 102 to proceed with different levels of caution (e.g., same level of caution with no occupants, low level of caution when no occupants are detected, and a high level of caution when several occupants are detected).

In various examples, a planning component and/or a perception component of the vehicle computing system may determine one or more predicted object trajectories based on the output (e.g., intent, attributes, etc.) from one or more of the first model 112 and/or the second model 114. In some examples, the trajectories may include any number of potential paths in which the objects 104 may travel from a current position (e.g., at the time of perception) and/or based on a direction of travel. In some examples, a potential path for one of the objects 104 may include remaining stationary. In such an example, the corresponding trajectory may represent little to no motion. In some examples, the number of trajectories may vary depending on a variety of factors, such as the classification of the object (e.g., type of object), other stationary and/or dynamic objects, drivable surfaces, etc.

In some examples, a model (e.g., the first model 112 or the second model 114) may use gaze detection 118 to determine whether object 104(5) is looking toward the street, and likely aware of their surroundings, or looking at the object 104(6), in which case the object 104(5) is likely to enter the roadway from between the row parked cars 110. In some examples, gaze detection, head detection, or other detection and recognition techniques may be implemented by the model. FIG. 1 depicts dashed lines from the head area of the pedestrian 104(5) to indicate a gaze direction. The model may also or instead determine that the pedestrian 104(5) is wearing ear buds and therefore unlikely to hear the vehicle approaching. Accordingly, the vehicle computing system may consider the attributes of the pedestrian (wearing ear buds, not looking at the vehicle, playing, running, and so on) during planning considerations.

In such examples, the vehicle computing system, such as via the first model 112 and/or the second model 114, may receive the sensor data associated with the objects 104 and determine attributes of the objects 104 based on the sensor data. For example, the vehicle computing system may be trained on captured image data of the objects 104 motion over time such that the vehicle computing system may recognize attributes that may represent cues or discrete events of the objects 104. Additionally or in the alternative, the vehicle computing system may utilize heat maps, tree search methods, and/or temporal logic formulas to determine probabilities of one or more candidate trajectories of the objects 104. In some examples, the one or more candidate trajectories may be determined or represented using a probabilistic heat map to predict object behavior, such as that described in U.S. patent application Ser. No. 15/807,521, filed Nov. 8, 2017, entitled "Probabilistic Heat Maps for Behavior Prediction," which is incorporated herein by reference. In some examples, the one or more candidate trajectories may be determined utilizing machine learning techniques.

In various examples, the vehicle computing system may determine a current processing unit usage and/or memory usage and determine whether to perform attribute processing using one or more of the first model 112 and/or the second model 114. In some examples, the vehicle computing system may determine that a processing unit usage and/or memory usage meets or exceeds a threshold and may determine to perform less attribute processing by one or more of the models. In some examples, the vehicle computing system may determine that a processing unit usage and/or memory usage is below a threshold, and based on the threshold being less than the threshold, may determine to perform additional attribute processing (such as, in order to identify finer levels of object classification). In some examples, the vehicle computing system may determine a current processing unit usage and/or memory usage and determine whether to treat an object differently in future prediction processing (such as by a planning component) based on the processing unit usage and/or memory usage. In such examples, the vehicle computing system may determine that a current processing unit usage and/or memory usage meets or exceeds a threshold value and based on the threshold being met or exceeded, the vehicle computing system may disregard processing one or more of the objects 104 by a model.

Figure 2:
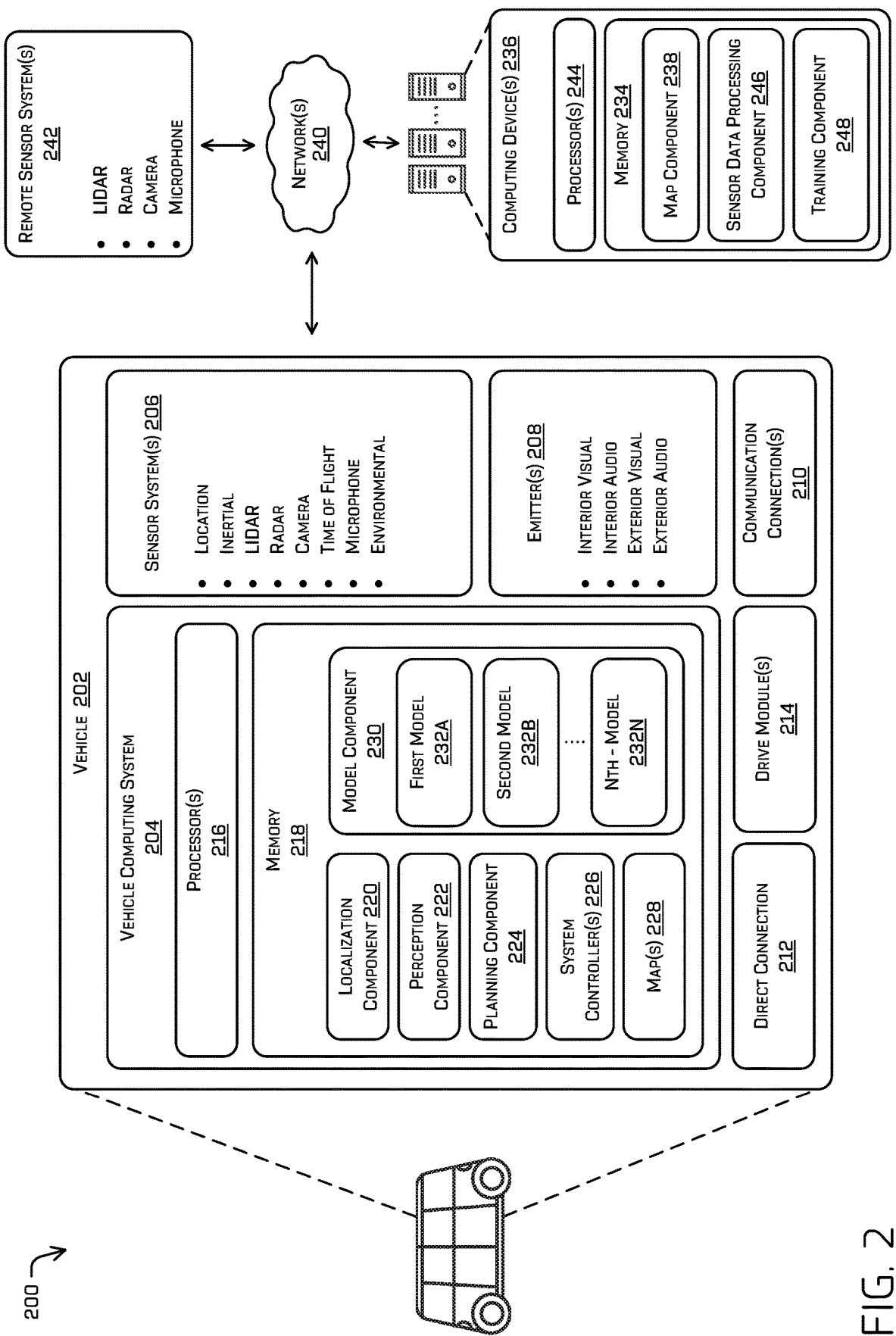
FIG. 2 is a block diagram of an example system for implementing the techniques described herein.

FIG. 2 is a block diagram of an example system 200 for implementing the techniques described herein. In at least one example, the system 200 may include a vehicle, such as vehicle 202.

The vehicle 202 may include a vehicle computing system 204, one or more sensor systems 206, one or more emitters 208, one or more communication connections 210, at least one direct connection 212, and one or more drive modules 214.

The vehicle computing system 204 may include one or more processors 216 and memory 218 communicatively coupled with the one or more processors 216. In the illustrated example, the vehicle 202 is an autonomous vehicle; however, the vehicle 202 could be any other type of vehicle, such as a semi-autonomous vehicle, or any other system having at least an image capture device (e.g., a camera enabled smartphone). In the illustrated example, the memory 218 of the vehicle computing system 204 stores a localization component 220, a perception component 222, a planning component 224, one or more system controllers 226, one or more maps 228, and a model component 230 including one or more models, such as a first model 232A, a second model 232B, up to an Nth model 232N (collectively "models 232"), where N can be any integer greater than 1. Though depicted in FIG. 2 as residing in the memory 218 for illustrative purposes, it is contemplated that the localization component 220, a perception component 222, a planning component 224, one or more system controllers 226, one or more maps 228, and/or a model component 230 including the models 232 may additionally, or alternatively, be accessible to the vehicle 202 (e.g., stored on, or otherwise accessible by, memory remote from the vehicle 202, such as, for example, on memory 234 of a remote computing device 236).

In at least one example, the localization component 220 may include functionality to receive data from the sensor system(s) 206 to determine a position and/or orientation of the vehicle 202 (e.g., one or more of an x-, y-, z-position, roll, pitch, or yaw). For example, the localization component 220 may include and/or request/receive a map of an environment, such as from map(s) 228 and/or map component 238, and may continuously determine a location and/or orientation of the autonomous vehicle within the map. In some instances, the localization component 220 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 220 may provide data to various components of the vehicle 202 to determine an initial position of an autonomous vehicle for determining the relevance of an object to the vehicle 202, as discussed herein.

In some instances, the perception component 222 may include functionality to perform object detection, segmentation, and/or classification. In some examples, the perception component 222 may provide processed sensor data that indicates a presence of an object (e.g., entity) that is proximate to the vehicle 202 and/or a classification of the object as an object type (e.g., car, pedestrian, cyclist, animal, building, tree, road surface, curb, sidewalk, unknown, etc.). In some examples, the perception component 222 may provide processed sensor data that indicates a presence of a stationary entity that is proximate to the vehicle 202 and/or a classification of the stationary entity as a type (e.g., building, tree, road surface, curb, sidewalk, unknown, etc.). In additional or alternative examples, the perception component 222 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 224 may determine a path for the vehicle 202 to follow to traverse through an environment. For example, the planning component 224 may determine various routes and trajectories and various levels of detail. For example, the planning component 224 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 202 to navigate.

In some examples, the planning component 224 may include a prediction component to generate predicted trajectories of objects (e.g., objects) in an environment. For example, a prediction component may generate one or more predicted trajectories for objects within a threshold distance from the vehicle 202. In some examples, a prediction component may measure a trace of an object and generate a trajectory for the object based on observed and predicted behavior.

In at least one example, the vehicle computing system 204 may include one or more system controllers 226, which may be configured to control steering, propulsion, braking, safety, emitters, communication, and other systems of the vehicle 202. The system controller(s) 226 may communicate with and/or control corresponding systems of the drive module(s) 214 and/or other components of the vehicle 202.

The memory 218 may further include one or more maps 228 that may be used by the vehicle 202 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 202 may be controlled based at least in part on the map(s) 228. That is, the map(s) 228 may be used in connection with the localization component 220, the perception component 222, and/or the planning component 224 to determine a location of the vehicle 202, detect objects in an environment, generate routes, determine actions and/or trajectories to navigate within an environment.

In some examples, the one or more maps 228 may be stored on a remote computing device(s) (such as the computing device(s) 236) accessible via network(s) 240. In some examples, multiple maps 228 may be stored based on, for example, a characteristic (e.g., type of entity, time of day, day of week, season of the year, etc.). Storing multiple maps 228 may have similar memory requirements, but increase the speed at which data in a map may be accessed.

As illustrated in FIG. 2, the vehicle computing system 204 may include a model component 230. The model component 230 may be configured to determine attributes of one or more objects, such as objects 104 of FIG. 1, to the vehicle 202. In various examples, the model component 230 may receive one or more features associated with the detected object(s) from the perception component 222 and/or from the sensor system(s) 206. In some examples, the model component 230 may receive environment characteristics (e.g., environmental factors, etc.) and/or weather characteristics (e.g., weather factors such as snow, rain, ice, etc.) from the perception component 222 and/or the sensor system(s) 206. While shown separately in FIG. 2, the model component 230 could be part of the perception component 222, the planning component 224, or other component(s) of the vehicle 202.

In various examples, the model component 230 may send outputs from the first model 232A, the second model 232B, and/or the Nth model 232N that are used by the planning component 224 to generate one or more predicted trajectories of the object (e.g., direction of travel, speed, etc.). In some examples, the planning component 224 may determine one or more actions (e.g., reference actions and/or sub-actions) for the vehicle 202. In some examples, the model component 230 may be configured to determine attributes of detected objects based at least in part on the one or more actions for the vehicle 202. In some examples, the planning component 224 may be configured to determine the actions that are applicable to the environment, such as based on environment characteristics, weather characteristics, or the like.

Models included in the model component 230 may determine features of an object in an image (e.g., a pedestrian in a bounding box) and determine attributes of the object based at least in part on the object features. In some examples, the first model 232A, the second model 232B, and/or the Nth model 232N may define different computational resources, classifiers, and/or algorithms that correspond to different levels of detection (e.g., gesture recognition, head detection, movement detection, and the like) and/or different levels of processing (e.g., a computational time, allocation of memory or processors, number of potential trajectories to simulate, etc.). In some examples, a single model may be configured to perform the processing associated with the first model 232A, the second model 232B, and so on. By processing a model to determine attributes of an object using different computational resources, algorithms, and/or classifiers, the model may provide attributes that improve safe operation of the vehicle by capturing attributes of the object with different levels of detail.

In various examples, the model component 230 may utilize machine learning techniques to determine features of an object in an image depicting an environment around a vehicle and/or determine attributes of the object in the image, as described with respect to FIG. 1 and elsewhere. In such examples, machine learning algorithms may be trained to determine one or more features and/or attributes of the object relative to the vehicle in the environment.

In some examples, the models may determine attributes of an object (e.g., infer an intent of the object) based on a pose of the object (e.g., position and orientation of the object), proximity of the object to another object in the environment (e.g., a crosswalk), or other cues evident in at least one of the image in a set of images. In some examples, the model may be trained to learn object attributes based at least in part on a pose of the object, and in some instances, how the pose changes over time. In some examples, the model component 230 may process one or more images in the set of images and/or may identify a pose of the object from a processed image. In some examples, the pose may be determined by the model component 230 from a single image without requiring an additional image to track movement of the object. Thus, once trained the model may determine an intent of the object from a single image, much like a driver can tell if an object will change direction or velocity based on subtle features of the object (e.g., a combination of subclasses of a pedestrian).

In some examples, a pose determined from multiple images may be associated with a single image of the multiple images. For instance, after processing a set of images, a single image in the set of images may be assigned a label that identifies a feature of an object in at least some of the multiple images. In a non-limiting illustrative example, a label may be assigned to an image such that fewer than all the multiple images are required to be saved in memory. In this way, a single image with a label determined from multiple images may enable a model to process a subsequent image and determine, from a pose of the object in the subsequent image, a likely action the object may take at a future time.

As can be understood, the components discussed herein (e.g., the localization component 220, the perception component 222, the planning component 224, the one or more system controllers 226, the one or more maps 228, the relevance determination component 530 including the rules component 232 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 218 (and the memory 234, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 206 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 206 may include multiple instances of each of these or other types of sensors. For instance, the lidar sensors may include individual lidar sensors located at the corners, front, back, sides, and/or top of the vehicle 202. As another example, the camera sensors may include multiple cameras disposed at various locations about the exterior and/or interior of the vehicle 202. The sensor system(s) 206 may provide input to the vehicle computing system 204. Additionally, or in the alternative, the sensor system(s) 206 may send sensor data, via the one or more networks 240, to the one or more computing device(s) 236 at a particular frequency, after a lapse of a predetermined period of time, in near real-time, etc. In some examples, the model component 230 may receive sensor data from one or more of the sensor system(s) 206.

The vehicle 202 may also include one or more emitters 208 for emitting light and/or sound. The emitters 208 may include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 208 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 may also include one or more communication connections 210 that enable communication between the vehicle 202 and one or more other local or remote computing device(s). For instance, the communication connection(s) 210 may facilitate communication with other local computing device(s) on the vehicle 202 and/or the drive module(s) 214. Also, the communication connection(s) 210 may allow the vehicle to communicate with other nearby computing device(s) (e.g., remote computing device 236, other nearby vehicles, etc.) and/or one or more remote sensor system(s) 242 for receiving sensor data. The communication connection(s) 210 also enable the vehicle 202 to communicate with a remote teleoperations computing device or other remote services.

The communication connection(s) 210 may include physical and/or logical interfaces for connecting the vehicle computing system 204 to another computing device or a network, such as network(s) 240. For example, the communication connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 may include one or more drive modules 214. In some examples, the vehicle 202 may have a single drive module 214. In at least one example, if the vehicle 202 has multiple drive modules 214, individual drive modules 214 may be positioned on opposite ends of the vehicle 202 (e.g., the front and the rear, etc.). In at least one example, the drive module(s) 214 may include one or more sensor systems to detect conditions of the drive module(s) 214 and/or the surroundings of the vehicle 202. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive module(s) 214. In some cases, the sensor system(s) on the drive module(s) 214 may overlap or supplement corresponding systems of the vehicle 202 (e.g., sensor system(s) 206).

The drive module(s) 214 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 214. Furthermore, the drive module(s) 214 may also include one or more communication connection(s) that enable communication by the respective drive module with one or more other local or remote computing device(s).

In at least one example, the direct connection 212 may provide a physical interface to couple the one or more drive module(s) 214 with the body of the vehicle 202. For example, the direct connection 212 may allow the transfer of energy, fluids, air, data, etc. between the drive module(s) 214 and the vehicle. In some instances, the direct connection 212 may further releasably secure the drive module(s) 214 to the body of the vehicle 202.

In at least one example, the localization component 220, the perception component 222, the planning component 224, the one or more system controllers 226, the one or more maps 228, and the model component 230, may process sensor data, as described above, and may send their respective outputs, over the one or more network(s) 240, to the computing device(s) 236. In at least one example, the localization component 220, the perception component 222, the planning component 224, the one or more system controllers 226, the one or more maps 228, and the model component 230 may send their respective outputs to the remote computing device(s) 236 at a particular frequency, after a lapse of a predetermined period of time, in near real-time, etc.

In some examples, the vehicle 202 may send sensor data to the computing device(s) 236 via the network(s) 240. In some examples, the vehicle 202 may receive sensor data from the computing device(s) 236 and/or remote sensor system(s) 242 via the network(s) 240. The sensor data may include raw sensor data and/or processed sensor data and/or representations of sensor data. In some examples, the sensor data (raw or processed) may be sent and/or received as one or more log files.

The computing device(s) 236 may include processor(s) 244 and a memory 234 storing the map component 238, a sensor data processing component 246, and a training component 248. In some examples, the map component 238 may include functionality to generate maps of various resolutions. In such examples, the map component 238 may send one or more maps to the vehicle computing system 204 for navigational purposes. In various examples, the sensor data processing component 246 may be configured to receive data from one or more remote sensors, such as sensor system(s) 206 and/or remote sensor system(s) 242. In some examples, the sensor data processing component 246 may be configured to process the data and send processed sensor data to the vehicle computing system 204, such as for use by the model component 230 (e.g., the first model 232A, the second model 232B, and/or the Nth model 232N). In some examples, the sensor data processing component 246 may be configured to send raw sensor data to the vehicle computing system 204.

In some instances, the training component 248 can include functionality to train a machine learning model to output features of an object and/or attributes of the object. For example, the training component 248 can receive a set of images (e.g., one or more images) that represents an object traversing through an environment for a period of time, such as 0.1 milliseconds, 1 second, 3, seconds, 5 seconds, 7 seconds, and the like. At least a portion of the set of images can be used as an input to train the machine learning model. As a non-limiting example, a first set (e.g., 3, 4, 5, or more) of a sequence of images may be input into the machine learned model. A second set of images (or attribute information associated therefrom—e.g., by extracting attributes from the images) in the sequence of images immediately preceding the first set may then be used as ground truth for training the model. Thus, by providing images of where objects traverse an environment, the training components 248 can be trained to output features of an object and/or attributes of the object, as discussed herein.

In some examples, the training component 248 can include training data that has been generated by a simulator. For example, simulated training data can represent examples where a vehicle collides with an object in an environment or nearly collides with an object in an environment, to provide additional training examples.

Additional details of the training component 248 and examples of data for training are discussed below in connection with FIG. 3, as well as throughout this disclosure.

The processor(s) 216 of the vehicle 202 and the processor(s) 244 of the computing device(s) 236 may be any suitable processor capable of executing instructions to process data and perform operations as described herein. By way of example and not limitation, the processor(s) 216 and 244 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 218 and memory 234 are examples of non-transitory computer-readable media. The memory 218 and memory 234 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 218 and memory 234 may include at least a working memory and a storage memory. For example, the working memory may be a high-speed memory of limited capacity (e.g., cache memory) that is used for storing data to be operated on by the processor(s) 216 and 244. In some instances, the memory 218 and memory 234 may include a storage memory that may be a lower-speed memory of relatively large capacity that is used for long-term storage of data. In some cases, the processor(s) 216 and 244 cannot operate directly on data that is stored in the storage memory, and data may need to be loaded into a working memory for performing operations based on the data, as discussed herein.

It should be noted that while FIG. 2 is illustrated as a distributed system, in alternative examples, components of the vehicle 202 may be associated with the computing device(s) 236 and/or components of the computing device(s) 236 may be associated with the vehicle 202. That is, the vehicle 202 may perform one or more of the functions associated with the computing device(s) 236, and vice versa. For instance, either the vehicle 202 and the computing device(s) 236 may perform training operations relating to one or more of the models described herein.

Figure 3:
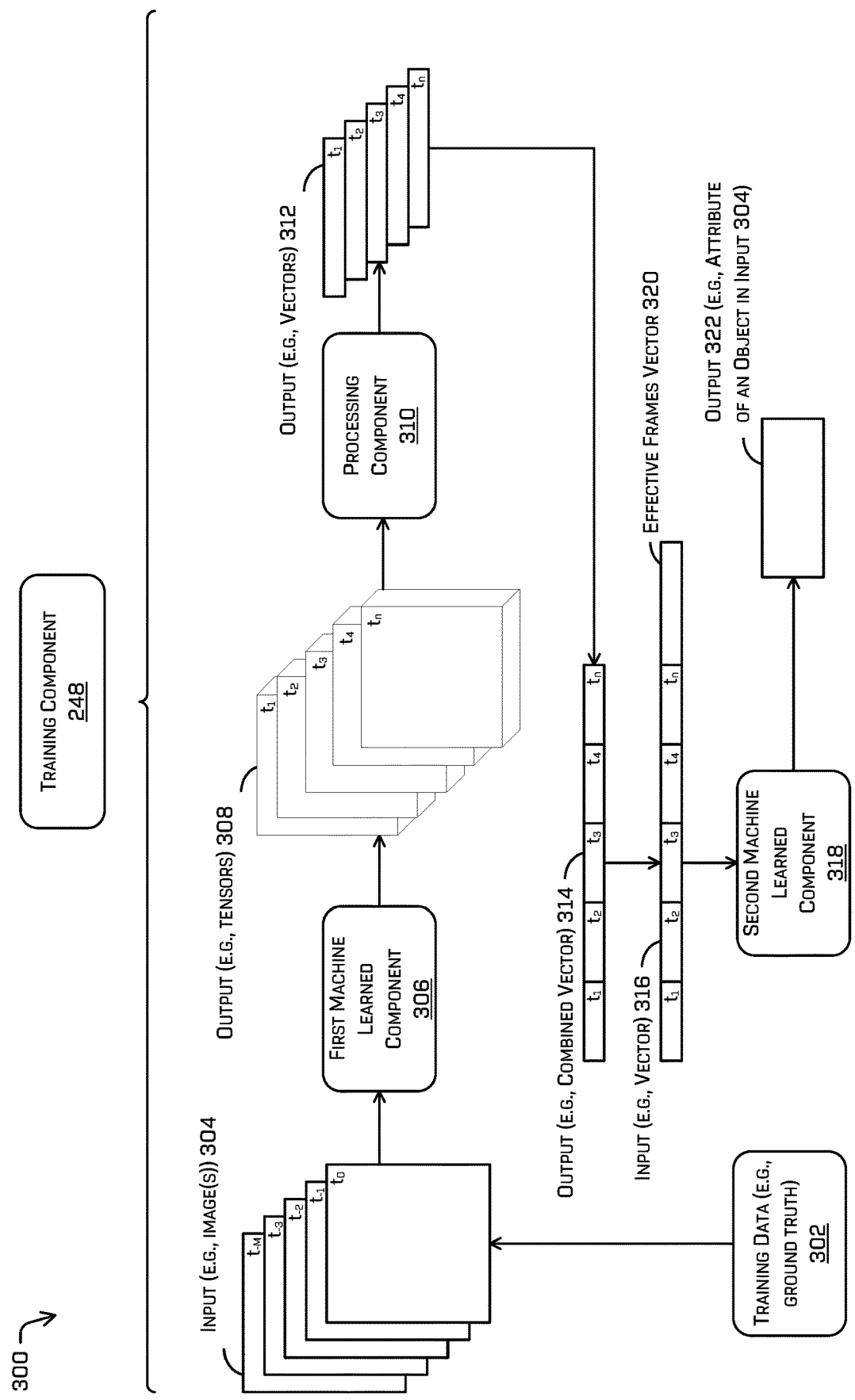
FIG. 3 depicts a block diagram of an example training component for training a machine learned model to implement the techniques described herein.

FIG. 3 depicts a block diagram 300 of an example training component (training component 248 of FIG. 2) for training a machine learned model to implement the techniques described herein. A vehicle computing system (e.g., vehicle computing system 204) and/or the computing device(s) 236 may implement the attribute determination model. While described as a separate system, in some examples, the attribute determination techniques described herein may be implemented by other vehicle systems, components, and/or computing devices. For example, and as will be described in further detail with regard to FIG. 2, the attribute determination techniques described herein may be implemented at least partially by or in association with a model component 230 and/or a planning component 224.

Training data 302 represents a ground truth of all objects and vehicles in the environment. For example, a ground truth may comprise labelled image data describing an expected attribute associated with the objects and vehicles in each frame of image data. As explained in more detail below, ground truth data may be compared against an output (e.g., a determined attribute) of a model for use in training. Differences in the ground truth data and the output may be determined based at least in part on future motion of the object (which may in some examples be determined from log data). During training, a loss function may be used to represent a difference in an expected output and an actual output and may be backpropagated through the model to determine which parameters of the model to augment or alter for improving the loss function (minimizing a difference between the expected output and the actual output). The training data 302 can include any number of frames in the future. The training data 302 may be used for training the first machine learned component 306 and/or the second machine learned component 318, for example.

In some examples, training data 302 can comprise data captured by a vehicle as it traverses through an environment (e.g., vehicle 102). Such training data can include action data, which may represent actions performed by an autonomous vehicle, if such an autonomous vehicle captured the training data 302. In some examples, an input 304 can be based at least in part on the training data 302.

The input 304 comprising one or more images can be input to the first machine learned component 306. FIG. 3 illustrates input data at times t1, t2, t3, t4, . . . tn (where n is an integer greater than 1). In some examples, the first machine learned component 306 can comprise a ResNet architecture. In some examples, the first machine learned component 306 can comprise the ResNet architecture as a base backbone. In some examples, action data can be input along the input 304, wherein the action data can be represented separately from the training data 302.

In some examples, an amount of images in the input 304 may correspond to a number of images (e.g., image frames). For instance, the input 304 may comprise multiple images such as five images in which each image represents an image of the object at different times. In some examples, image data (e.g., training data, sensor data, cached data, or other data describing an image) used as the input 304 may be limited such that there are not enough images to meet the number of images. In such examples, one or more duplicate images (duplicates of any one of the input image(s)) may be used as the input 304 such that the number of images is satisfied.

In some examples, the number of images (or image frames) in the input 304 may be predetermined. In some examples, the number of images (or image frames) in the input 304 may be determined dynamically based on one or more conditions (e.g., based on the amount of available sensor data or based on available processing capacity).

In some examples, there may be an insufficient amount of images to form an input 304 (e.g., less than five frames of data representing the object has been received by the vehicle), resulting in a duplicate image (or data representing the duplicate image) being retrieved from memory and included as part of the input 304. The duplicate image may be a duplicate of a most recent image that includes a detected object. In some examples, an image received for processing by a model may be determined to no longer comprise an object (e.g., the object was not detected in the frame), although a subsequent image may show the object again. In such examples, the image to be processed that does not include the detected object (e.g., the object was missing, occluded, or hidden from detection by a sensor), may be replaced with a duplicate image that comprises the object, such as image data received before or after the image without the detected object.

In various examples, sensor data captured by a sensor of a vehicle may be used as the input 304. For example, the sensor data can include data captured by one or more of: a lidar sensor, a radar sensor, an image sensor, a time of flight sensor, a sonar sensor, and the like. The sensor data may represent an object detected by the vehicle as the vehicle navigates in an environment. In examples when an object is first detected, the input 304 may comprise one image (or image frame). In such examples, the training component 248 may duplicate the single image frame one or more times to form another image frame that is then used in the input 304 to satisfy the number of images (e.g., the image frame may be duplicated four times for a total of five input frames).

In some examples, each of the multiple image frames in the input 304 may be input into corresponding models (e.g., copies of the first machine learned component 306) such that the multiple image frames are processed in parallel (e.g., at a substantially same time).

In some examples, the first machine learned component 306 provides an output 308 (e.g., tensors) representative of features of an object in the input 304. For example, the first machine learned component 306 may determine one or more features for an object in the image(s) and output a representation of the one or more features (labeled $t_1$-$t_n$). In an example when the object is a pedestrian, the feature(s) of the pedestrian may be associated with a characteristic, velocity, trajectory, and/or pose of the pedestrian, just to name a few. In some examples, one or more features may be associated with any one of the outputs labeled $t_1$-$t_n$). Additional details of example features are discussed throughout the disclosure.

In some examples, the output 308 associated with the first machine learned component 306 can be processed (e.g., via a processing component 310) to modify a configuration (e.g., a shape, a size, etc.) of the output 308. For instance, the processing component 310 may decompose and/or flatten the output 308 to form output 312 (e.g., values, vectors).

In some examples, the training component 248 may combine the output 312 (e.g., a vector for each image of input 304) to determine the output 314 (e.g., a combined vector). By way of example and not limitation, the training component 248 may concatenate outputs (e.g., outputs 312 at t1, t2, . . . , tn) associated with each respective image of the output 312 (labeled t1-tn).

In various examples, the training component 248 may determine an input 316 (e.g., a value, a vector, etc.) for the second machine learned component 318. The input 316 may, in some examples, comprise the output 314 (e.g., the combined vector) and an effective frames vector 320. However, in other examples, the effective frames vector 320 may not form part of the input 316. In some examples, the second machine learned component 318 can comprise a series of fully connected layers architecture.

The effective frames vector 320 indicates whether an image of the input 304 is a duplicate of another image in the input 304. In some examples, the effective frames vector 320 may indicate duplicate data in the input 316, and the second machine learned component 318 may process the input 316 based at least in part on the duplicate data indicated by the effective frames vector 320. In some examples, the duplicate data in the input 316 may comprise cached data associated with a previous output prior to and/or during processing by the second machine learned component 318. By processing the input 316 by the second machine learned component 318, the attribute(s) of the object may be determined with consideration to additional data (e.g., data representing additional features of an object such as the duplicate data, feature vector data, cached feature vector data, etc.). This improves attribute determination by determining an attribute from multiple features.

A set of image frames associated with the object may be captured by a sensor of a vehicle and may include a number of images (one or more images). In some examples, the first machine learned component 306 and/or the second machine learned component 318 may receive five image frames as input. In examples when the sensor has not yet captured five image frames such as when an object is first detected by the sensor, cached data representing an image frame may be duplicated to satisfy the number of images. Accordingly, not all the images captured by sensor of the vehicle may be useful (by virtue of being a duplicate image frame or because the image frame represents only minor changes from a previous image frame).

As mentioned above, in some examples, the effective frames vector 320 indicates whether the input 316 may comprise duplicate data. For instance, in examples when the input 316 comprises five image frames, the effective frames vector 320 may comprise a '1' to indicate the image frame is not a duplicate (e.g., a real image frame) or a '0' to indicate the image frame is a duplicate. Thus, in an illustrative example, if the input 316 comprises duplicate data for the fourth and fifth image frames, then the effective frames vector 320 will be [1,1,1,0,0].

An image frame may be duplicated so that the input 316 comprises a particular number of images (or image frames). By way of example and not limitation, four image frames may be received for processing by the second machine learned model 318, though five image frames are needed for the input 31. In some examples, one of the four images may not include an object (due to the object being occluded, or for other reasons). For instance, a vector representing the four input image frames may include [1, 2, X, 3] where numerals 1, 2, and 3 represent different image frames with a same object at different times and X represents an image frame that does not include the object present in the other image frames. In this illustrative example, the first image frame, the second image frame, and/or the third image frame may be duplicated to achieve five image frames as input and/or to replace an image frame that does not include the object. Thus, the input 316 may comprise five images represented by a vector [1,1,2,3,3] and a corresponding effective frames vector 320 comprises [0,1,1,0,1] to indicate that the first image frame and the fourth image frame comprise duplicate data (as indicated by '0').

In various examples, the second machine learned component 318 may provide an output 322 that represents an attribute (e.g., a current state) of an object in the input 304. In some examples, the object may be a pedestrian, and the attribute of the pedestrian indicates whether the pedestrian may walk, run, change direction, change position, change velocity, enter a crosswalk, enter a roadway, and so on. For instance, the output 322 from the second machine learned component 318 may represent an instantaneous intent of the pedestrian. In some examples, the attributes of the pedestrian may comprise one or more of: standing, walking, running, crouching, sitting, lying down, police worker, construction worker, holding a street sign (up, down, or sideways), child, elderly, (wrinkles, grey hair), walking implement (walking aids, seeing aids, etc.), holding an open umbrella, wearing headphones/earbuds, talking on phone, looking at object in hand, playing, child in stroller, person pushing or pulling stroller/cart, loading/unloading an item, wheelchair, walking an animal, eye contact with vehicle, exiting car, loading/unloading vehicle, driving/riding in an enclosed vehicle (on tram, in car, etc.), driving/riding in or on an open vehicle (trolley, escalator, etc.), skateboard rider, scooter rider, roller skate rider, and the like.

In some examples, the output 322 from the second machine learned component 318 can be compared against training data 302 (e.g., ground truth representing labelled image data) for use in training. For instance, based at least in part on the comparison, parameter(s) associated with the first machine learned component 306 and/or the second machine learned component 318 can be augmented, altered, and/or updated. In some examples, operations performed by the training component 248 may be performed on another system, such as the vehicle computing system 204, and results of the training may be transferred to one or more vehicles in the environment (e.g., vehicle 202 or another vehicle in a fleet of vehicles).

Figure 4:
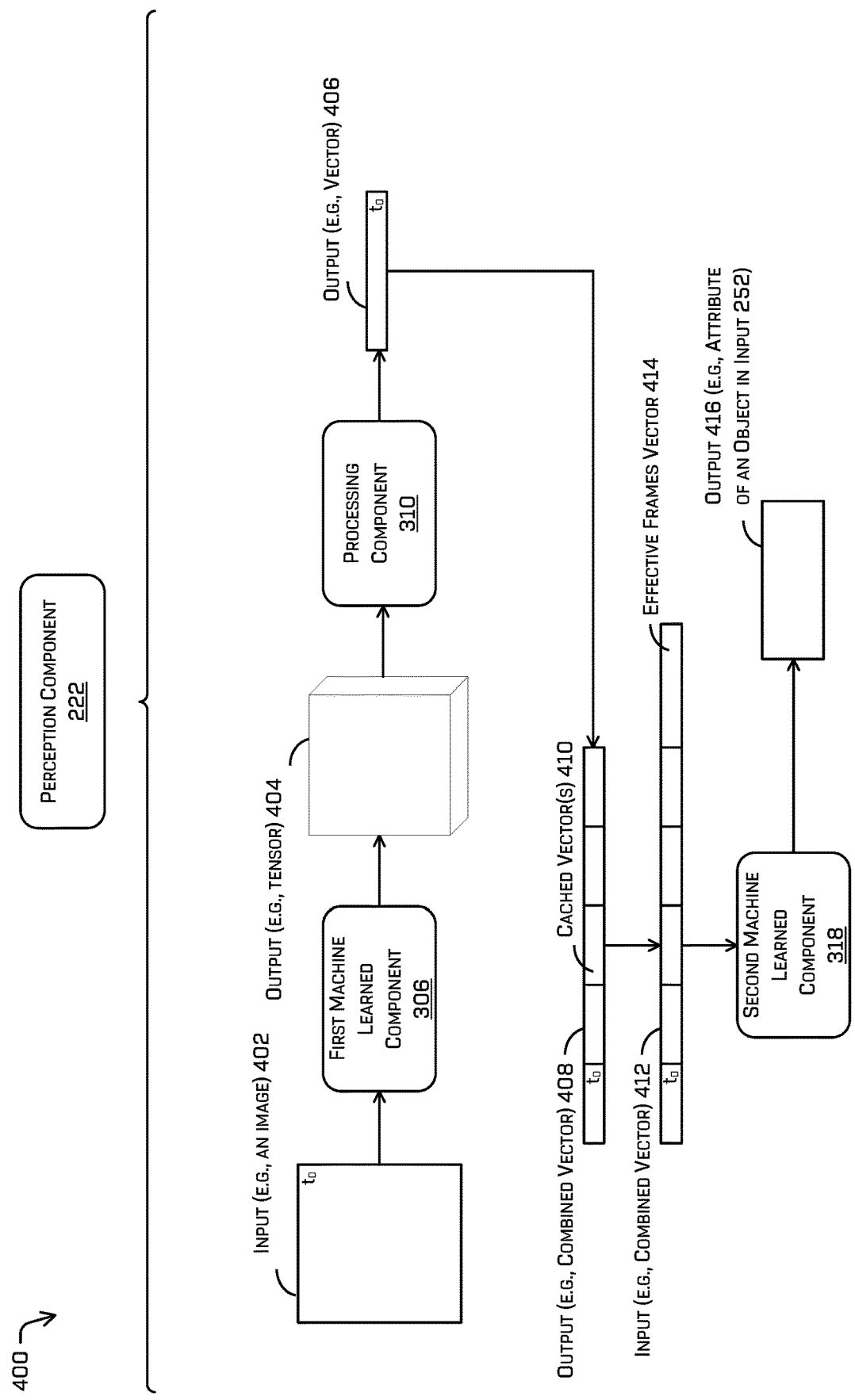
FIG. 4 depicts a block diagram of an example perception component for a machine learned model to implement the techniques described herein.

FIG. 4 depicts a block diagram 400 of an example perception component for training a machine learned model to implement the techniques described herein. A vehicle computing system (e.g., vehicle computing system 204) and/or the computing device(s) 236 may implement attribute determination models. While described as a separate system, in some examples, the attribute determination techniques described herein may be implemented by other vehicle systems, components, and/or computing devices. For example, and as will be described in further detail with regard to FIG. 2, the attribute determination techniques described herein may be implemented at least partially by or in association with a model component 230 and/or a perception component 222.

In some examples, input 402 can comprise data captured by a vehicle as it traverses through an environment (e.g., vehicle 102). Such data can include action data, which may represent actions performed by an autonomous vehicle, if such an autonomous vehicle captured the input 402. In some examples, the input 402 may comprise an individual image or cropped image frame of an object represented in sensor data of the vehicle. As the vehicle navigates the environment, additional images are captured for different times and provided as the input 402 to the first machine learned component 306. In some examples, image frames may be cropped to a same scale such that each image comprises a same size (a same aspect ratio, etc.) when included in the input 402.

As additional sensor data is received, output(s) by the first machine learned component 306 (e.g., the output 404 or the output 406) may be stored in memory (e.g., cache memory). In some examples, an output stored in memory may be retrieved and used as the input 402. In an illustrative example, storing an output may be based at least in part on an object being present in an image associated with the sensor data (e.g., images without the object may be omitted from storage). In some examples, the cache memory may be associated with and/or be directly a part of the first machine learned component 306.

In some examples, the first machine learned component 306 provides an output 404 (e.g., tensors) representative of features of an object in the input 304. For example, the first machine learned component 306 may determine one or more features for an object in the image and output a representation of the one or more features at a time to. In an example when the object is a pedestrian, the feature(s) of the pedestrian may identify the pedestrian's age, physical features, position, an action, just to name a few. As additional sensor data is received, output(s) by the first machine learned component 306 (e.g., output 308, output 312, output 404, or output 406) may be stored in memory (e.g., cache memory). In some examples, as described further below the output 404 stored in memory may be retrieved by the second machine learned component 318 and used as the input 412. In an illustrative example, storing the output 404 may be based at least in part on an object being present in an image associated with the sensor data (e.g., images without the object may be omitted from being stored in memory).

In some examples, the output 404 associated with the first machine learned component 306 can be processed (e.g., via a processing component 310) to modify a configuration (e.g., a shape, a size, etc.) of the output 404. For instance, the processing component 310 may decompose and/or flatten the output 404 to form output 406 (e.g., a value, a vector, and the like).

In some examples, the perception component 222 may determine an output 408 (e.g., a combined vector) by combining the output 406 with one or more cached vectors 410. By way of example and not limitation, the training component 248 may concatenate the output 408 with any number of cached vectors to satisfy the number of images. Additionally or alternatively, the perception component 222 may duplicate the input 402 to form another image that is then used as one of the cached vector(s) 410.

In various examples, the perception component 222 may determine an input 412 (e.g., a vector) for the second machine learned component 318. The input 412 may, in some examples, comprise the output 408 (e.g., the combined vector) and an effective frames vector 414. However, in other examples, the effective frames vector 414 may be excluded from the input 412. In some examples, the second machine learned component 318 can comprise a series of fully connected layers architecture.

The input 412 may include a number of images (one or more images). In the illustrated example of FIG. 4, the second machine learned component 318 may receive five image as the input 412. In examples when the sensor has not yet captured five images, a cached image and/or a previously captured image (e.g., a cached vector) may be duplicated, and the duplicated image may be included in the input 412 as part of the number of images.

In various examples, the second machine learned component 318 may provide an output 416 that represents an intent of an object in the input 402. In some examples, the object maybe a pedestrian, and the intent of the pedestrian indicates whether the pedestrian may walk, run, change direction, change position, change velocity, enter a crosswalk, enter a roadway, and so on. For instance, the output 416 from the second machine learned component 318 may represent one or more attributes of the pedestrian comprising at least one of an action, a position, a pose, an orientation, or a subclassification of the pedestrian.

Figure 5:
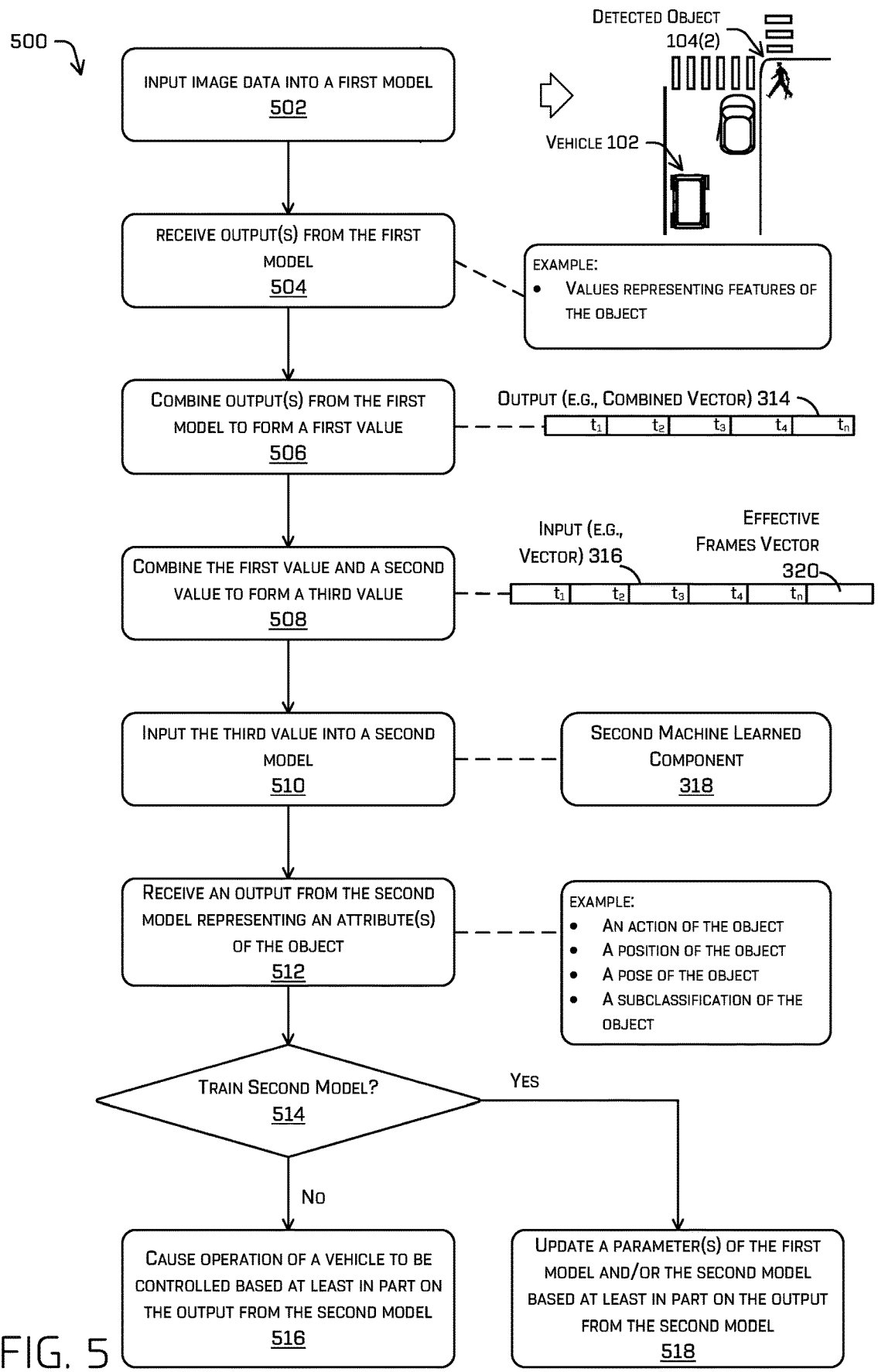
FIG. 5 is a flowchart depicting an example process for determining attributes of objects using different models.

FIG. 5 illustrates example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 5 is a flowchart depicting an example process 500 for determining attributes of objects using different models. Some or all of the process 500 may be performed by one or more components in FIG. 2, as described herein. For example, some or all of process 500 may be performed by the vehicle computing system 204 and/or the computing device(s) 236.

At operation 502, the process may include inputting at least a portion of image data into a first model. The image data may comprise sensor data representing an object detected in an environment around a vehicle. In some examples, such a portion may correspond to an object detected in the image data. Examples of such image data are discussed throughout this disclosure. For example, the image data can represent an image, multiple images, a multi-channel image, an object as a bounding box, a velocity of the object, a position of the object in the environment, and the like.

The vehicle computing system may be configured to detect an object based on sensor data and input at least a portion of the sensor data into a machine learned model (e.g., first machine learned component 306). The sensor data may be received from one or more sensors on the vehicle and/or from one or more remote sensors. In some examples, the vehicle computing system may be configured to detect dynamic objects (objects 104(2) and 104(5)) and/or static objects and combine the associated sensor data with map data. In some examples, the map data may represent fixed features of an environment including but not limited to crosswalks, traffic signals, school zones, and the like. In some examples, objects may be detected utilizing one or more heat maps.

In various examples, the objects may be detected utilizing machine learned techniques. In such examples, one or more machine learned algorithms may be trained to detect objects based on sensor data. In some examples, the objects may be detected utilizing temporal logic, and/or tree search methods.

In some examples, the operation 502 can include capturing sensor data using a plurality of sensors and fusing or combining the sensor data into a detail and informative representation of the environment.

In some instances, the image data input into the first model may be duplicated as discussed throughout this disclosure. For instance, a portion of the image data may be duplicated so that a particular number of images (or portions thereof) are included in the image data. In some examples, data associated with a previous output by the first model may be retrieved from memory and included in the image data. Additional details of duplicating image data are discussed throughout the disclosure.

At operation 504, the process may include receiving output(s) from the first model. For instance, the vehicle computing system may receive one or more outputs from the first model representing features of an object in the image data. In some examples, the first model may generate multiple outputs that correspond to different input images captured at different times. In some examples, the first model may generate a single output representing feature(s) of an object in an image. In some examples, the first model may generate multiple outputs, each output representing feature(s) of an object in a respective image. Additional details of features of the object are discussed throughout the disclosure.

At operation 506, the process may include combining outputs from the first model to form a first value. Examples of such combining of outputs are discussed throughout this disclosure. For instance, the vehicle computing system may concatenate outputs from the first model to form a vector or other value that represents each respective output collectively. Outputs from the first model may be combined in a variety of ways, including combining output(s) immediately generated by the first model and/or outputs stored in memory from a previous processing instance of the first model.

At operation 508, the process may include combining the first value and a second value to form a third value. For example, the vehicle computing system 204 and/or the computing device(s) 236 may combine output 314 with an effective frames vector 320 to form an input (e.g., input 316) to the second model (e.g., second machine learned component 318, as discussed throughout this disclosure). Of course, in at least some examples, such vectors (or sets of values) need not be concatenated and may be input separately.

At operation 510, the process may include inputting the third value into the second model. For example, the second machine learned component 318 may receive the input 316.

At operation 512, the process may include receiving an output from the second model representing an attribute(s) of the object. For instance, the second model (e.g., the second machine learned component 318) may generate the output 322 and optionally communicate the output 322 to a perception component 222 and/or a planning component 224 which may use the output 322 in determining an action for a vehicle navigating in an environment. Additional details of determining attributes by a model are discussed throughout the disclosure.

At operation 514, the process may include determining whether to train the second model. For example, the operation 514 can include determining if a model is currently being trained, or whether the model has been trained previously. In some examples, a vehicle computing system may process image data as part of a training operation, an inference operation, or a training operation and an inference operation in parallel. If the second model is not being trained (e.g., "no" in the operation 514), the process can continue to operation 516 to cause operation of a vehicle to be controlled based at least in part on the output by the second model. If the second model is being trained (e.g., "yes" in the operation 514), the process continues to operation 518 to update a parameter(s) of the first model and/or the second model based at least in part on the output by the second model. Of course, in some examples, operations can be performed in parallel, depending on an implementation.

At the operation 516, data representing the output by the second model may be communicated with the planning component of the vehicle computing system to plan a trajectory for the vehicle that is based at least in part on the output by the second model. Additional details of controlling a vehicle using an output from the first model and/or the second model are discussed throughout the disclosure.

At the operation 518, one or more parameters of the second model may be updated, altered, and/or augmented to train the respective model. In some instances, the output 322 from the second machine learned component 318 can be compared against training data 258 (e.g., ground truth representing labelled image data) for use in training. Based at least in part on the comparison, parameter(s) associated with the first machine learned component 306 and/or the second machine learned component 318 can be updated.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 502, 504, 506, and 510 may be performed without operation 508. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and non-transitory computer-readable storage media storing instructions that, when executed by the one or more processors, cause the system to perform operations comprising: inputting first image data into a first machine learned model, the first image data associated with a first time; receiving, from the first machine learned model, a first output associated with the first image data; inputting second image data into the first machine learned model, the second image data associated with a second time, the second time different than the first time; receiving, from the first machine learned model, a second output associated with the second image data; concatenating the first output and the second output to form a first vector; concatenating the first vector and a second vector to form a third vector; inputting the third vector into a second machine learned model; receiving, from the second machine learned model, a third output indicative of one or more attributes of an object represented in the first image data; and altering a parameter of the second machine learned model based at least in part on the third output.

B: A system as paragraph A describes, the operations further comprising: storing the first output in memory; inputting subsequent image data into the first machine learned model; receiving, from the first machine learned model, a fourth output associated with the subsequent image data; inputting a concatenation of the fourth output and the first output into the second machine learned model, wherein the second output is retrieved from the memory; and receiving, from the second machine learned model, an additional attribute of the object represented in the subsequent image data.

C: A system as paragraphs A or B describe, wherein the second vector represents a difference between the first image data and the second image data.

D: A system as paragraphs A-C describe, the operations further comprising: storing the first output in memory; receiving subsequent output from the first machine learned model associated with subsequent image data; determining whether the object is present in the subsequent image data; and at least one of: storing the subsequent output in memory based at least in part on whether the object is present; and accessing the first output from the memory based at least in part on whether the object is present.

E: A system as paragraphs A-D describe, wherein: the object comprises a pedestrian, the first image data depicts the pedestrian at the first time, the second image data depicts the pedestrian at the second time, and the attribute of the pedestrian comprises at least one of an action, a position, or a subclassification of the pedestrian at a third time.

F: A non-transitory computer-readable storage media storing instructions that, when executed, cause one or more processors to perform operations comprising: receiving, from a first model an output corresponding to an image frame; inputting, into a second model, a combination of the output from the first model, an additional feature vector associated with an additional image frame, and an indication of a difference between the additional image frame and the image frame; receiving, from the second model, an output indicative of an attribute an object represented in the image frame; and at least one of: causing operation of a vehicle to be controlled based at least in part on the output, or altering a parameter of the second model based at least in part on the output.

G: A non-transitory computer-readable storage media as paragraph F describes, wherein the additional feature vector is retrieved from memory.

H: A non-transitory computer-readable storage media as paragraphs F or G describe, wherein the indication of the difference between the additional image frame and the image frame indicates whether the additional image frame is a duplicate of the image frame.

I: A non-transitory computer-readable storage media as paragraphs F-H describe, wherein the first model and the second model comprise portions of a third model.

J: A non-transitory computer-readable storage media as paragraphs F-I describe, wherein the first model comprises a first machine learned model trained to identify features of the object and the second model comprises a second machine learned model trained to identify the attribute of the object in an environment of the vehicle.

K: A non-transitory computer-readable storage media as paragraphs F-J describe, wherein the second model receives five image frames as input.

L: A non-transitory computer-readable storage media as paragraphs F-K describe, further comprising comparing the output to ground truth data and wherein altering the parameter of the second model is based at least in part on the comparing.

M: A non-transitory computer-readable storage media as paragraphs F-L describe, wherein the output is a first output and further comprising: receiving, from the first model, a second output; and concatenating the first output and the second output from the first model to form an input to the second model.

N: A non-transitory computer-readable storage media as paragraphs F-M describe, further comprising inputting multiple image frames into the first model, at least one image frame in the multiple image frames being a duplicate of another image frame in the multiple image frames.

O: A method comprising: inputting sensor data into a first model; receiving, from the first model, a first output associated with the sensor data; combining a first value comprising a representation of the first output and a second value to form a third value; inputting the third value into a second model; receiving, from the second model, a second output indicative of an attribute of an object represented in the sensor data; and at least one of: causing operation of a vehicle to be controlled based at least in part on the second output, or altering a parameter of the second model based at least in part on the second output.

P: A method as paragraph O describes, wherein the sensor data represents a first image frame and a second image frame of an image sensor, and the second value represents a difference between the first image frame and the second image frame.

Q: A method as paragraphs O or P describe, further comprising: determining an absence of the object in at least one of the first image frame or the second image frame; and based at least in part on the determination, at least one of: omitting the first image frame or the second image frame from being input into the second model, or replacing the first image frame or the second image frame with the other of the first image data or the second image data.

R: A method as paragraphs O-Q describe, wherein combining the first value and the second value comprises concatenating the first value and the second value.

S: A method as paragraphs O-R describe, wherein the object comprises a pedestrian and the attribute of the pedestrian comprises at least one of an action, a position, or a subclassification of the pedestrian.

T: A method as paragraph O-S describe, wherein the representation of the first output comprises a decomposing or flattening of the first output.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the) systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
non-transitory computer-readable storage media storing instructions that, when executed by the one or more processors, cause the system to perform operations comprising:
inputting sensor data into a first model;
receiving, from the first model, a first output associated with the sensor data;
combining a first value comprising a representation of the first output and a second value to form a third value;
inputting the third value into a second model;
receiving, from the second model, a second output indicative of an attribute of an object represented in the sensor data; and
at least one of:
causing operation of a vehicle to be controlled based at least in part on the second output, or
altering a parameter of the second model based at least in part on the second output.

2. The system of claim 1, wherein:
the sensor data represents a first image frame and a second image frame of an image sensor, and
the second value represents a difference between the first image frame and the second image frame.

3. The system of claim 2, the operations further comprising:
determining an absence of the object in at least one of the first image frame or the second image frame; and
based at least in part on the determination, at least one of:
omitting the first image frame or the second image frame from being input into the second model, or
replacing the first image frame or the second image frame with the other of the first image frame or the second image frame.

4. The system of claim 1, wherein combining the first value and the second value comprises concatenating the first value and the second value.

5. The system of claim 1, wherein:
the object comprises a pedestrian, and
the attribute of the pedestrian comprises at least one of an action, a position, or a subclassification of the pedestrian.

6. The system of claim 1, wherein the representation of the first output comprises a decomposing or flattening of the first output.

7. One or more non-transitory computer-readable storage media storing instructions that, when executed, cause one or more processors to perform operations comprising:
   inputting sensor data into a first model;
   receiving, from the first model, a first output associated with the sensor data;
   combining a first value comprising a representation of the first output and a second value to form a third value;
   inputting the third value into a second model;
   receiving, from the second model, a second output indicative of an attribute of an object represented in the sensor data; and
   at least one of:
      causing operation of a vehicle to be controlled based at least in part on the second output, or
      altering a parameter of the second model based at least in part on the second output.

8. The one or more non-transitory computer-readable storage media of claim 7, wherein:
   the sensor data represents a first image frame and a second image frame of an image sensor, and
   the second value represents a difference between the first image frame and the second image frame.

9. The one or more non-transitory computer-readable storage media of claim 8, the operations further comprising:
   determining an absence of the object in at least one of the first image frame or the second image frame; and
   based at least in part on the determination, at least one of:
      omitting the first image frame or the second image frame from being input into the second model, or
      replacing the first image frame or the second image frame with the other of the first image frame or the second image frame.

10. The one or more non-transitory computer-readable storage media of claim 7, wherein combining the first value and the second value comprises concatenating the first value and the second value.

11. The one or more non-transitory computer-readable storage media of claim 7, wherein:
   the object comprises a pedestrian, and
   the attribute of the pedestrian comprises at least one of an action, a position, or a subclassification of the pedestrian.

12. The one or more non-transitory computer-readable storage media of claim 7, wherein the representation of the first output comprises a decomposing or flattening of the first output.

13. The one or more non-transitory computer-readable storage media of claim 7, wherein the attribute of the object comprises at least one of an action, a position, or a subclassification of the object.

14. The one or more non-transitory computer-readable storage media of claim 7, wherein:
   the first model comprises a first machine learned model trained to identify features of the object, and
   the second model comprises a second machine learned model trained to identify the attribute of the object in an environment of the vehicle.

15. A method comprising:
   inputting sensor data into a first model;
   receiving, from the first model, a first output associated with the sensor data;
   combining a first value comprising a representation of the first output and a second value to form a third value;
   inputting the third value into a second model;
   receiving, from the second model, a second output indicative of an attribute of an object represented in the sensor data; and
   at least one of:
      causing operation of a vehicle to be controlled based at least in part on the second output, or
      altering a parameter of the second model based at least in part on the second output.

16. The method of claim 15, wherein:
   the sensor data represents a first image frame and a second image frame of an image sensor, and
   the second value represents a difference between the first image frame and the second image frame.

17. The method of claim 16 further comprising:
   determining an absence of the object in at least one of the first image frame or the second image frame; and
   based at least in part on the determination, at least one of:
      omitting the first image frame or the second image frame from being input into the second model, or
      replacing the first image frame or the second image frame with the other of the first image frame or the second image frame.

18. The method of claim 16, wherein the first image frame is associated with a first time and the second image frame is associated with a second time different from the first time.

19. The method of claim 15, wherein:
   the object comprises a pedestrian, and
   the attribute of the pedestrian comprises at least one of an action, a position, or a subclassification of the pedestrian.

20. The method of claim 15, wherein the representation of the first output comprises a decomposing or flattening of the first output.

* * * * *